United States Patent [19]

Holy et al.

[11] 4,068,384
[45] Jan. 17, 1978

[54] LINEAR POSITION MEASURING DEVICE

[75] Inventors: Josef K. Holy; Alan R. Henderson, both of Carlsbad, Calif.

[73] Assignee: Hughes Aircraft Company, Culver City, Calif.

[21] Appl. No.: 741,260

[22] Filed: Nov. 12, 1976

[51] Int. Cl.² .......................... G01B 3/12; G01B 5/04; G01B 7/04
[52] U.S. Cl. ..................................... 33/141 F; 33/129
[58] Field of Search ................... 33/129, 125 M, 132, 33/133, 134, 141 F, 141 R

[56] References Cited

U.S. PATENT DOCUMENTS

| | | | |
|---|---|---|---|
| 1,415,483 | 5/1922 | Reichmann | 33/141 F |
| 2,689,610 | 9/1954 | Myers | 33/129 X |
| 2,782,516 | 2/1957 | Stoeckel et al. | 33/129 |
| 3,015,165 | 1/1962 | Steele | 33/134 R |
| 3,758,954 | 9/1973 | Teplitz | 33/141 F |

FOREIGN PATENT DOCUMENTS

| | | | |
|---|---|---|---|
| 866,253 | 2/1953 | Germany | 33/125 M |
| 1,021,535 | 3/1966 | United Kingdom | 33/141 F |

*Primary Examiner*—Harry N. Haroian
*Attorney, Agent, or Firm*—Lawrence V. Link, Jr.; W. H. MacAllister

[57] ABSTRACT

In accordance with one disclosed embodiment, a continuous steel belt passed around two pulleys which are disposed so that the belt is in contact with a magnetic strip bonded to the surface of a conveyor. A rotary measuring device, such as photoelectric encoder, is attached to the shaft of one of said pulleys and the output signals from the encoder provide an accurate measurement of the linear travel of the conveyor.

2 Claims, 4 Drawing Figures

LINEAR POSTION MEASURING DEVICE

BACKGROUND OF THE INVENTION

This invention relates generally to devices for measuring linear travel and more particularly to devices for very accurately measuring the bidirectional movements of a conveyor.

For numerous applications in which materials are transported by conveyor from one processing station to another it is required that the advance of the conveyor be accurately measured so that the parameters of the material sensed at one station may be associated with the proper segment of the material at a subsequent processing station. For example, U.S. patent application Ser. No. 704,191 filed July 9, 1976, entitled "System and Method for the Measurement of Repetitive Patterns" by Josef K. Holy and assigned to the assignee of the subject application, deals with such a system used in the garment industry. In this just referenced system cloth is transported on a conveyor surface between a first station where the plaid characteristics of the material are measured to a subsequent station where computer control cutting devices automatically cut pattern pieces from the cloth goods. A good plaid match in the finish garment requires very accurate measurement of the travel of the conveyor so that proper correlation is maintained between the measuring and cutting operations.

For a number of reasons, prior art linear position measurement devices are inadequate for applications of the type just described. For example, in one such prior art device, which may generally be classified as an intermittent, reciprocating action, position measuring device, the distance measured is limited to the length of travel of a measuring head and movement of the conveyor has to be stopped to allow recycling of the head.

Prior art rotary type measuring devices are generally driven from the conveyor sprocket (bull gear), the sprocket drive shaft, or the rollers and are subject to errors caused by eccentricities, backlash in the gears and chains, and compliance between rotating conveyor members and the points on the conveyor where measurement is desired.

Prior art friction wheel type linear measuring devices are subject to errors caused by wear, slip and surface irregularities.

SUMMARY OF THE INVENTION

It is therefore a primary object of the subject invention to provide an improved linear position measuring device.

A more specific object is to provide an improved device for very accurately measuring bidirectional travel of a conveyor.

Another object of the invention is to provide an improved measuring device capable of continuous measurements over an unlimited travel distance.

A further object is to provide an improved measuring device which utilizes magnetic coupling so as to provide a non-slip operation and repeatable tracking of a conveyor's movement without errors due to, for example, wear of the tracking head.

Briefly stated, linear position measuring devices in accordance with the subject invention comprise a continuous steel belt coupled between two pulleys or sprocket wheels with the shafts of the pulleys being rotatably mounted to a support bar. The position of one of the pulleys is fixed while the other has a spring coupled thereto so as to maintain the belt taut. A rotary measuring device, such as a photoelectric shaft encoder is attached to the pulley which is mounted in the fixed position. A magnetic strip is bonded to the surface of a linearly moving object such as a conveyor whose travel is to be measured. The support bar which mounts the pulleys is disposed above the conveyor so that the outer surface of the steel belt is in contact with the magnetic strip on the conveyor whereby magnetic forces provide strong non-slip coupling between the belt and the conveyor.

The linear travel of the conveyor is translated into rotary motion of the shaft of the encoder and the linear travel of the conveyor is indicated by the output signals from the encoder. In accordance with the subject invention, errors encountered in prior art devices such as caused by eccentricity, or gear backlash are avoided since the measurement accuracies are determined almost exclusively by the circumference of the pulley coupled to the encoder. Problems with wear of the surface which senses the movement of the conveyor are avoided due to the use of magnetic non-slip coupling between the measuring belt and the conveyor. Also the magnetic attraction avoids the need for precision vertical alignment between the lower tape surface and the magnetic strips since the belt will be attracted to the magnetic strip.

BRIEF DESCRIPTION OF THE DRAWINGS

The novel features of the subject invention, as well as the invention itself, and the objects and advantages thereof will be better understood from the accompanying description taken in conjunction with the accompanying drawings in which.

DETAILED DESCRIPTION OF THE PREFERRED EMBODIMENT

Referring now to the figures, a conveyor assembly 10 (only a portion thereof is shown) includes honeycomb slat sections 12 which are mounted to a guide chain 14. Material 15 to be transported by conveyor 10, such as cloth for example, is shown on slat sections 12.

Figure 1:
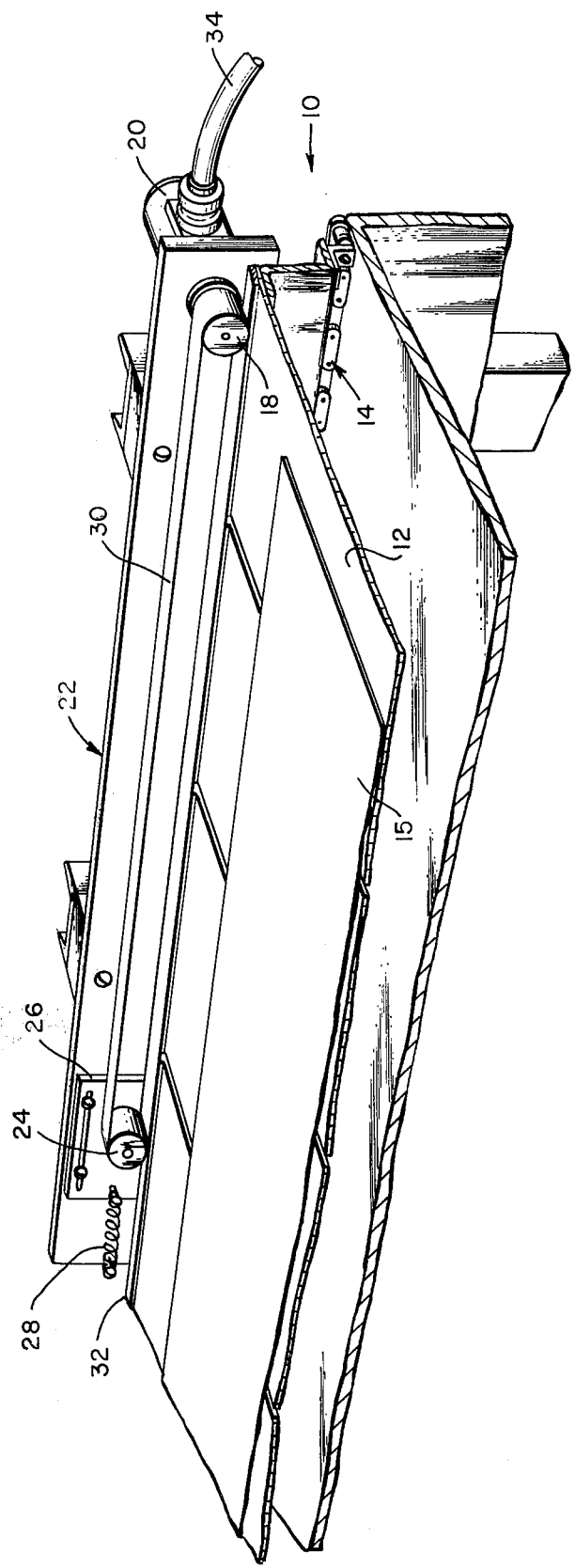
FIG. 1 is a perspective view of a linear position measuring device in accordance with the principles of the subject invention.
Figure 2:
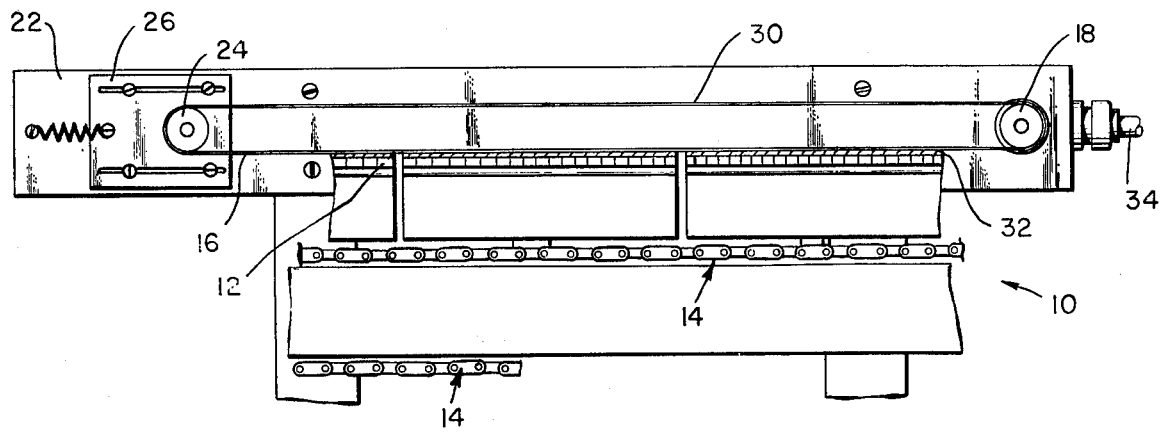
FIG. 2 is a side elevational view of the system shwon in FIG. 1.
Figure 3:
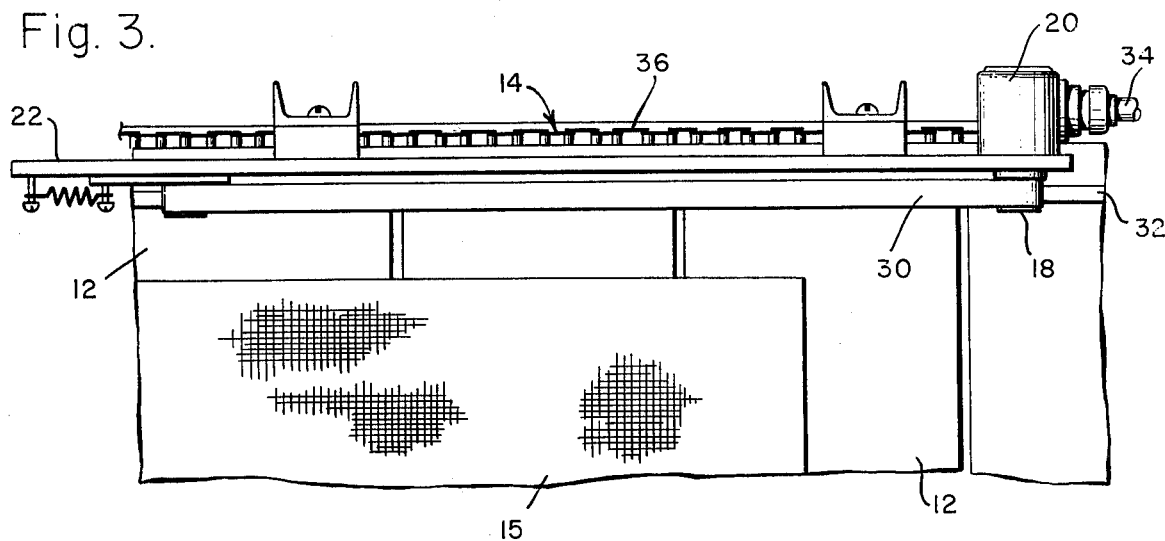
FIG. 3 is a top plan view of the system shown in FIGS. 1 and 2.
Figure 4:
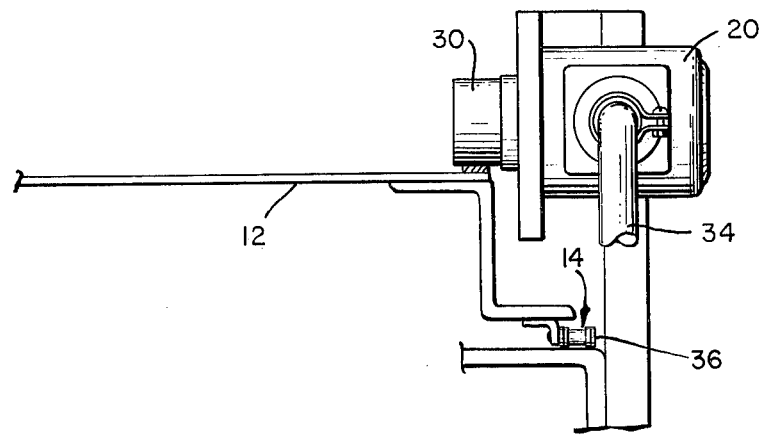
FIG. 4 is an end view of a portion of the structure shown in FIGS. 1 through 3.

A pulley 18 of a precise, preselected, diameter is mounted on the shaft of a measuring device 20. Measuring device 20 which may be a photoelectric encoder or a resolver, for example, is rigidly mounted to a support structure 22 (FIG. 1). A second pulley 24 is attached to a shaft which is mounted on a plate 26, and plate 26 in turn is slideably mounted on support structure 22. One end of a spring 28 is anchored to support structure 22 while its other end is attached to plate 26.

A continuous steel belt 30 passes around pulleys 18 and 24 and spring 28 applies the desired tension so that belt 30 is maintained taut to ensure that it does not slip on pulley 18. Belt 30 may be, for example, one inch wide and three feet long.

The only modification to conveyor 10 required by the subject invention is the bonding, e.g. gluing, of magnetic strips 32 to one edge of slat sections 12.

In operation of the subject invention, support structure 22 is mounted above the conveyor 10 so that the outer surface 16 of steel belt 30 contacts magnetic strips 32. Steel belt 30 and strips 32 are magnetically coupled so that as the conveyor advances belt 30 is caused to move in synchronism therewith. This in turn causes the rotation of precision circumference pulley 18 and hence the translation of the linear travel of the conveyor into rotary motion.

Rotary measuring device 20 may be a photoelectric encoder such as Model No. 76BI-1000-1-1-1-A manufactured by the Encoder Division of Litton Industries of Chatsworth, Calif. Such an encoder provides two output signals on separate leads of cable 34, with each output signal having the same number of square wave signals. The number of said signals is indicative of the distance traveled by conveyor 10 and the phase of the two square wave signals defines the direction of travel, i.e. whether the conveyor moves in the forward or reverse direction.

The processing of such pairs of square wave signals is shown in greater detail in FIGS. 12a and 12b of the above cited U.S. patent application Ser. No. 704,191. However, to briefly summarize the encoder's output signals are processed by use of electronic circuitry and two trains of pulses are derived from each edge of the square wave. One pulse train is indicative of clockwise rotation, the other of counter-clockwise rotation of the encoder shaft.

The above referenced encoder provides 1000 square wave cycles per one revolution and associated circuitry generates 4,000 output pulses per revolution of its shaft; and so if pulley 18 has a four-inch circumference, for example, the encoder provides one output pulse for every .001 inches of travel of the conveyor.

Although only one preferred embodiment of the subject invention has been described hereinabove, it will be readily apparent to those skilled in the art that numerous modifications thereto may be made within the scope of the appended claims. For example, pulley 18 may be replaced by a wheel having sprocket teeth which are adapted for engagement of holes in metal band 30. In such an embodiment the tension applied to pulley 24 may be selected so as to calibrate the system, i.e. the band is slightly stretched so that the holes therein are exactly the correct distance apart. This stretching of the tape may be used to compensate for any accumulative type error that would result if the circumference of pulley 18 were not the exact design value.

Another way to compensate for accumulative type errors is to electronically add or substract (depending on the sign of the error) a pulse from the count held in said counter (not shown) each time a preselected number of pulses have been counted.

Similarly, although the illustrated embodiment shows the magnetic strips 32 mounted on honeycomb slat sections 12, alternatively the magnetic strip could be mounted on the chain link sections 36. In this case the support structure 22 would be positioned and oriented relative to conveyor 10 such that steel belt 30 would be magnetically coupled to the magnetic strips on the chain link sections. Also it should be understood that belt 30 could be magnetized and strips 32 unmagnetized or both of these elements could be magnetized with opposite polarities so as to attract one another.

Thus having described a new and useful linear measuring device which is particularly adapted for very accurately measuring the bidirectional travel of a conveyor, what is claimed is:

1. A device for providing output signals indicative of the linear travel of a conveyor, said device comprising:
   magnetic strips rigidly fastened along the length of the conveyor;
   a support frame;
   two pulleys;
   a shaft encoder rotary measuring device fixidly mounted to said support frame, said rotary measuring device having an input shaft coupled to one of said pulleys and is adapted for providing output signals indicative of the rotation of said input shaft;
   a plate slideably mounted to said support frame and rotatably mounting said other pulley;
   an endless steel belt passing around said two pulleys; and
   a spring connected between said plate and said frame whereby said belt is tautly maintained;
   said support frame being disposed relative to said conveyor so that said belt is in contact with said magnetic strips; whereby
   the output signals from said rotary measuring device are indicative of the linear travel of the conveyor.

2. The device of claim 1 wherein said rotary measuring device is a photoelectric shaft encoder.

* * * * *